(12) United States Patent
Wang et al.

(10) Patent No.: US 12,371,050 B2
(45) Date of Patent: Jul. 29, 2025

(54) METHOD FOR EARLY WARNING A BLIND AREA, ELECTRONIC DEVICE AND STORAGE MEDIUM

(71) Applicant: HON HAI PRECISION INDUSTRY CO., LTD., New Taipei (TW)

(72) Inventors: Cheng-Feng Wang, Kaohsiung (TW); Po-Chung Wang, New Taipei (TW); Li-Che Lin, Kaohsiung (TW); Yen-Yi Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 148 days.

(21) Appl. No.: 18/507,315

(22) Filed: Nov. 13, 2023

(65) Prior Publication Data
US 2025/0074444 A1    Mar. 6, 2025

(30) Foreign Application Priority Data
Aug. 31, 2023 (CN) .......................... 202311121809.5

(51) Int. Cl.
*B60Q 1/00* (2006.01)
*B60W 50/14* (2020.01)
*G06V 20/58* (2022.01)
*B60W 50/00* (2006.01)

(52) U.S. Cl.
CPC ............. *B60W 50/14* (2013.01); *G06V 20/58* (2022.01); *B60W 2050/0056* (2013.01); *B60W 2420/403* (2013.01); *B60W 2554/4045* (2020.02); *B60W 2554/80* (2020.02); *G06V 2201/07* (2022.01); *G06V 2201/08* (2022.01)

(58) Field of Classification Search
CPC ......... B60W 50/14; B60W 2050/0056; B60W 2420/403; B60W 2554/4045; B60W 2554/80; G06V 20/58; G06V 2201/07; G06V 2201/08; B60R 1/22; B60R 2300/8026; B60Q 9/008; G08B 31/00; G08G 1/0125; G08G 1/0137; H04N 9/3179
See application file for complete search history.

(56) References Cited

U.S. PATENT DOCUMENTS

| | | | |
|---|---|---|---|
| 8,315,433 B2 * | 11/2012 | Hsu ........................ | G06V 20/58 |
| | | | 382/104 |
| 10,169,895 B2 * | 1/2019 | Saito ....................... | G06T 7/521 |
| 11,507,101 B2 | 11/2022 | Lee et al. | |
| 11,978,261 B2 * | 5/2024 | Shokonji .............. | G05D 1/0246 |

(Continued)

*Primary Examiner* — Toan N Pham
(74) *Attorney, Agent, or Firm* — ScienBiziP, P.C.

(57) ABSTRACT

A method for early warning a blind area of a vehicle. In the method, the electronic device obtains at least one target image acquired by at least one camera of the vehicle. The electronic device further determines parameters of at least one target object in each of the at least one target image and a three-dimensional detection frame for each of the at least one target object based on the parameters. The electronic device further obtains a target detection frame of each of the at least one target object in a top view image of a plane where the vehicle is located by projecting the three-dimensional detection frame into the top view image and outputs alert information in response that an overlapped area exists between the target detection frame and a preset blind area of the top view image.

20 Claims, 8 Drawing Sheets

(56) References Cited

U.S. PATENT DOCUMENTS

| | | | | |
|---|---|---|---|---|
| 12,214,733 B2* | 2/2025 | Nakahara | ............... | G03B 37/06 |
| 2020/0327343 A1* | 10/2020 | Lund | ....................... | H04W 4/46 |
| 2022/0024316 A1* | 1/2022 | Suzuki | ............... | G02B 27/0101 |

* cited by examiner

METHOD FOR EARLY WARNING A BLIND AREA, ELECTRONIC DEVICE AND STORAGE MEDIUM

FIELD

The present disclosure relates to a field of vehicle safety technology, in particular to a method for early warning a blind area, an electronic device, and a storage medium.

BACKGROUND

In order to maintain a safe vehicle distance and avoid accidents due to a target (for example, a pedestrian or a vehicle) moving into any blind area of a current vehicle during driving of the current vehicle, it is necessary to monitor all the blind areas around the current vehicle and find the target in any one of the blind areas of the vehicle in time, so as to carry out blind area early warning in time. A computer vision algorithm is used to analyze target images collected by cameras deployed around the current vehicle to determine whether any targets have entered the blind area. However, this method may fail to accurately determine a distance between the target vehicle and the current vehicle and may not ensure safety of driving the vehicle.

DETAILED DESCRIPTION

In order to enable a clearer understanding of objectives, features, and advantages of the present disclosure, the present disclosure is described in detail below in conjunction with accompanying drawings and specific embodiments. It should be noted that the embodiments of the present disclosure and features in the embodiments may be combined with each other without conflict. Many specific details are set forth in the following description in order to facilitate a full understanding of the present disclosure, the described embodiments being only a portion of the embodiments of the present disclosure and not all of them.

Further, the terms "first" and "second" are used only for descriptive purposes and are not to be construed as indicating or implying relative importance or implying an indication of the number of technical features indicated. Thus, a feature defining "first" and "second" may include, either explicitly or implicitly, one or more of the features. In the description of this disclosure, "multiple" means two or more unless specifically defined otherwise.

Unless otherwise defined, all technical and scientific terms used herein have the same meaning as commonly understood by those skilled in the art to which the present disclosure belongs. The terms used herein in the specification of the present disclosure are for the purpose of describing specific embodiments only and are not intended to limit the present disclosure. As used herein, the term "and/or" includes any combinations of one or more related listed items.

The embodiment of the present disclosure provides a method for early warning a blind area which can be applied to one or more electronic devices, wherein the electronic devices are devices capable of automatically performing numerical calculation and/or information processing according to preset or stored instructions, and the hardware thereof includes, but is not limited to, a microprocessor, an application specific integrated circuit (ASIC), a field-programmable gate array (FPGA), a digital signal processor (DSP), an embedded device, and the like.

An electronic device can be any kind of electronic product that can interact with a user, such as a personal computer, a tablet, a smartphone, a personal digital assistant (PDA), a game console, an internet protocol television (IPTV), a smart wearable device, etc.

The electronic device may also include a network device. The network device includes, but is not limited to, a single network server, a group of servers including a plurality of network servers, or a cloud including a plurality of hosts or network servers based on cloud computing.

The network in which the electronic equipment is located includes, but is not limited to, Internet, Wide Area Network (WAN), Metropolitan Area Network (MAN), Local Area Network (LAN), Virtual Private Network (VPN), etc.

Figure 1:
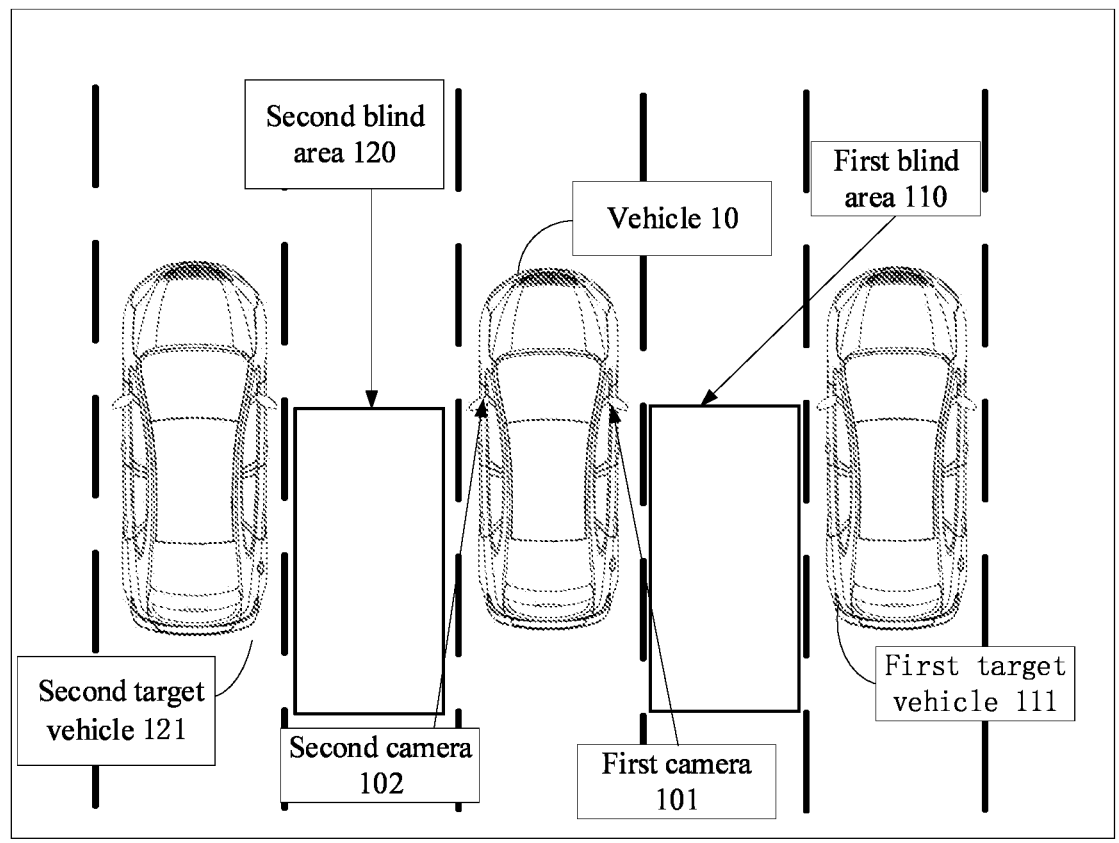
FIG. 1 is an application scenario diagram of a method for early warning a blind area according to an embodiment of the present disclosure.

As shown in FIG. 1, the method for early warning a blind area provided in the present disclosure may be applied to an on-board system of a vehicle 10 or an electronic device communicatively connected to the vehicle 10. A blind area is an area that is not visible to a driver and is relatively close to the vehicle 10 during driving. For example, a first blind area 110 on right side of the vehicle 10 and a second blind area 120 on left side of the vehicle 10 are shown in FIG. 1. In some embodiments, a first target vehicle 111 may be traveling outside the first blind area 110 and a second target vehicle 121 may be traveling outside the second blind area 120. When the first target vehicle 111 enters the first blind area 110 or the second target vehicle 121 enters the second blind 120, a traffic accident may occur because the vehicle 10 cannot detect the first target vehicle 111 of the first blind area 110 or the second target vehicle 111 of the second blind area 120 in time. A first camera 101 in communication with the vehicle 10 monitors the first blind area 110 in real time, and a second camera 102 in communication with the vehicle monitors the second blind area 120 in real time, ensuring driving safety of the vehicle 10. The electronic device receives monitoring data from the first camera 101 and the second camera 102 and analyzes received monitoring data in real time to determine whether the first target vehicle 111 enters the first blind area 110 and/or the second target vehicle 121 enters the second blind area 120 in time. Then the electronic device outputs an early warning to the vehicle to improve the driving safety of the vehicle 10, in response that the first target vehicle 111 enters the first blind area 110 and/or the second target vehicle 121 enters the second blind area 120.

In at least one embodiment of the present disclose, the electronic device analyzes target images taken by the first camera 101 and the second camera 102 to identify a two-dimensional detection frame of the target vehicle in the target image and determines whether the two-dimensional detection frame and the blind area are overlapped. If the two-dimensional detection frame and the blind area are overlapped, the electronic device determines that the target vehicle has entered the blind area, and outputs an early warning message to the vehicle 10 to prompt a driver of the vehicle to pay attention to driving safety. If the two-dimensional detection frame and the blind area are not overlapped, the electronic device determines that the target vehicle does not enter the blind area, and there is no need to output the early warning message to the vehicle 10.

Figure 2:
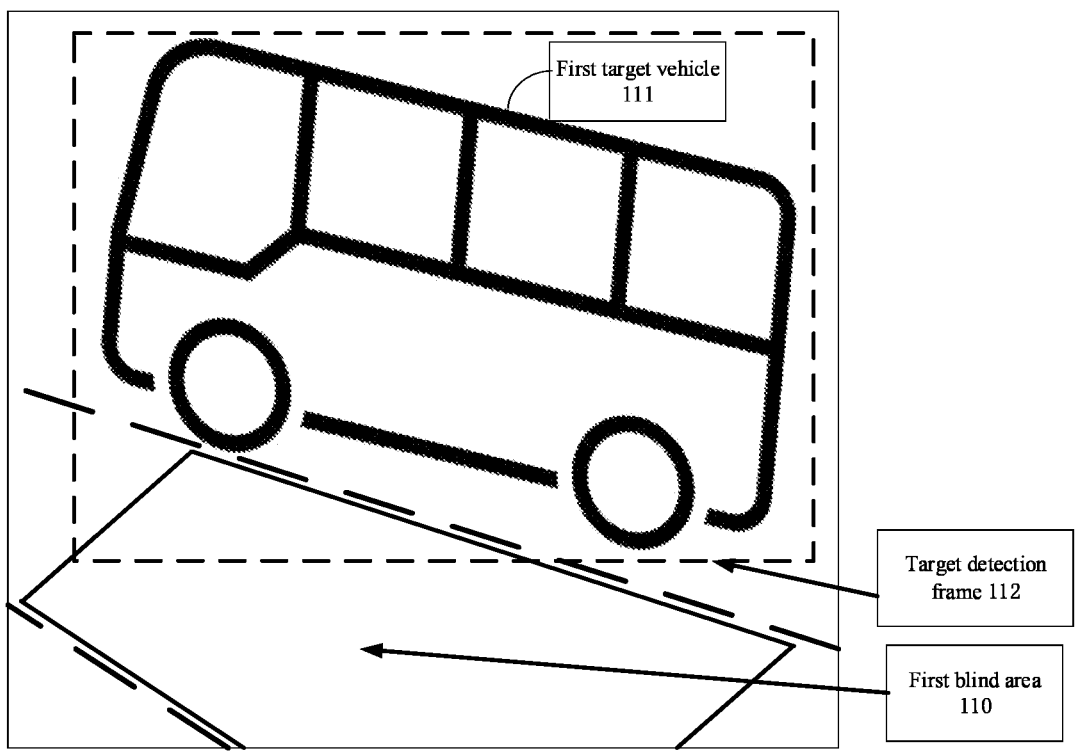
FIG. 2 is a diagram of a target image according to an embodiment of the present disclosure.

In one embodiment, since the first camera 101 and the second camera 102 are unable to capture a distance between the target vehicle and the vehicle 10, and the two-dimensional detection frame of the target vehicle in the target image may be distorted, the electronic device may output alert information by mistakes. For example, as shown in FIG. 2, the target image taken by the first camera 101 in which the first target vehicle 111 does not enter the first blind area 110. However, due to the distortion of the two-dimensional detection frame in the target image, there is an overlapping area between a target detection frame 112 of the first target vehicle 111 and the first blind area 110. Therefore, the vehicle-mounted system of the vehicle 10 may output the early warning message, which reducing an accuracy of the blind area warning.

In order to solve the problem that the vehicle 10 misjudges that the target vehicle has driven into a blind area after the two-dimensional detection frame in the target image generates distortion. The method for early warning a blind area shown in FIG. 3 can be adopted to accurately determine whether a target vehicle drives into the blind area of the vehicle 10 and improve the driving safety of the vehicle 10. Depending on the requirements, the sequence of bocks in the flowchart can be changed, and some bocks can be omitted.

Block S30, the electronic device obtains at least one target image acquired by at least one camera.

In one embodiment of the present disclosure, in order to ensure the driving safety of the vehicle, at least one camera of the vehicle monitors at least one blind area of the vehicle, and obtains at least one target image. The at least one camera provides visual information of the vehicle body for a driver or an automatic driving system. The at least one camera is in communication connection with an electronic device. The at least one blind area can be an area around the vehicle that cannot be observed by the driver and is close to the vehicle.

In one embodiment of the present disclosure, the at least one camera can be mounted on a vehicle head, a vehicle tail, and left and right side rear-view mirrors. It can be seen that the blind area around the vehicle is at least one, and the target image of each blind area is collected by a corresponding camera.

In one embodiment of the present disclosure, the at least one camera acquires the at least one target image at the same time provides data support for identifying a target object in any one blind area of the vehicle. The target image is a two-dimensional image, and contains at least one target object, and the at least one target object can be any object such as a vehicle, a pedestrian, an obstacle, etc.

In one embodiment of the present disclosure, when the at least one camera acquires the at least one target image at the same time, the electronic device records the time to acquire the at least one target image as a time stamp of the target image.

In one embodiment of the present disclosure, when the at least one camera acquires the at least one target image at the same time, different cameras acquire the target image at different times due to different system times of the cameras, so it is necessary to record the time when each camera acquires the target image and marks the time as the time stamp of the target image.

At least one embodiment, it is possible to avoid that the time of some of the at least one camera is not uniform, and to uniformly mark the time stamp of the target image by uniformly marking the time stamp of the target image, thereby providing a unified time stamp for the target image acquired at the same time and providing a unified time standard for subsequent de-reproduction of the target object in different target images.

Block S31, the electronic device determines parameters of at least one target object in each of the at least one target image.

In one embodiment of the present disclosure, in order to avoid the negative influence of the distortion of the two-dimensional detection frame of the target object in the target image on early warning for the blind areas, the electronic device extracts the parameters of the at least one target object in each of the at least one target image, and determines a three-dimensional detection frame of each of the at least one target object according to the parameters, and determines position and size of the each of the at least one target object through the three-dimensional detection frame, so as to avoid a problem that wrongly warning the blind area caused by the distortion of the target object in the two-dimensional image. The parameters of at least one target object include size information and posture information.

In one embodiment of the present disclosure, the electronic device determines the parameters of at least one target object in each of the at least one target image by inputting the at least one target image to a target detection model to obtain a two-dimensional detection frame corresponding to each of the at least one target object, and the electronic device inputs image information corresponding to the two-dimensional detection frame to a posture recognition model to obtain category of each of the at least one target object and posture information of the each of the at least one target object. The electronic device determines a size of each of the at least one target object according to the category of each of the at least one target object.

In one embodiment of the present disclosure, the target detection model can be a deep learning model with a target detection function such as YOLO, SSD, etc., and the category of the target detection model is not limited in the present disclosure. The electronic device obtains the two-dimensional detection frame of each of the at least one target object of the target image and a category of the each of the at least one target object by inputting the target image into the target detection model. In one embodiment, the two-dimensional detection frame represents an image area of the target image that belongs to the target object.

In one embodiment of the present disclosure, the posture recognition model may be a DeepBox model, an RTM3D model, a MonoRCNN model, etc. The electronic device obtains the posture information of each of the at least one target object by inputting image information of the two-dimensional detection frame to the posture recognition model. The posture information includes an angle and a size of the target object in a camera coordinate system.

In one embodiment of the present disclosure, different categories of target objects correspond to different sizes, and the categories of target objects predicted by the posture recognition model can be used to determine the corresponding sizes of the target objects from a pre-stored category size correspondence table. For example, when the category of the target object is "Truck", the corresponding size includes a length of the truck is 4.2 m, a width of the truck is 1.9 m, and a height of the truck is 1.8 m.

Figure 4:
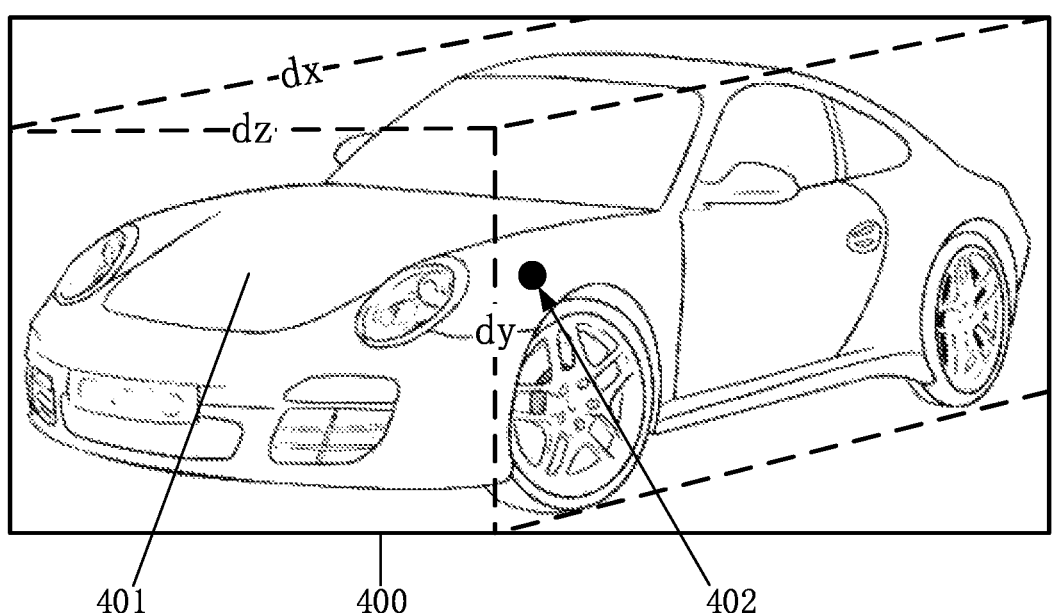
FIG. 4 is a schematic view of a three-dimensional detection frame according to an embodiment of the present disclosure.

For example, as shown in FIG. 4, there is a schematic view of the size of the target object, the target object 401 corresponds to a two-dimensional detection frame 400, and the size of the target object 401 predicted by the posture recognition model in the target image 400 is $d_x$, $d_y$, $d_z$ respectively. And coordinate of a center point 402 of the target object 401 is ($t_x$, $t_y$, $t_z$).

Figure 5:
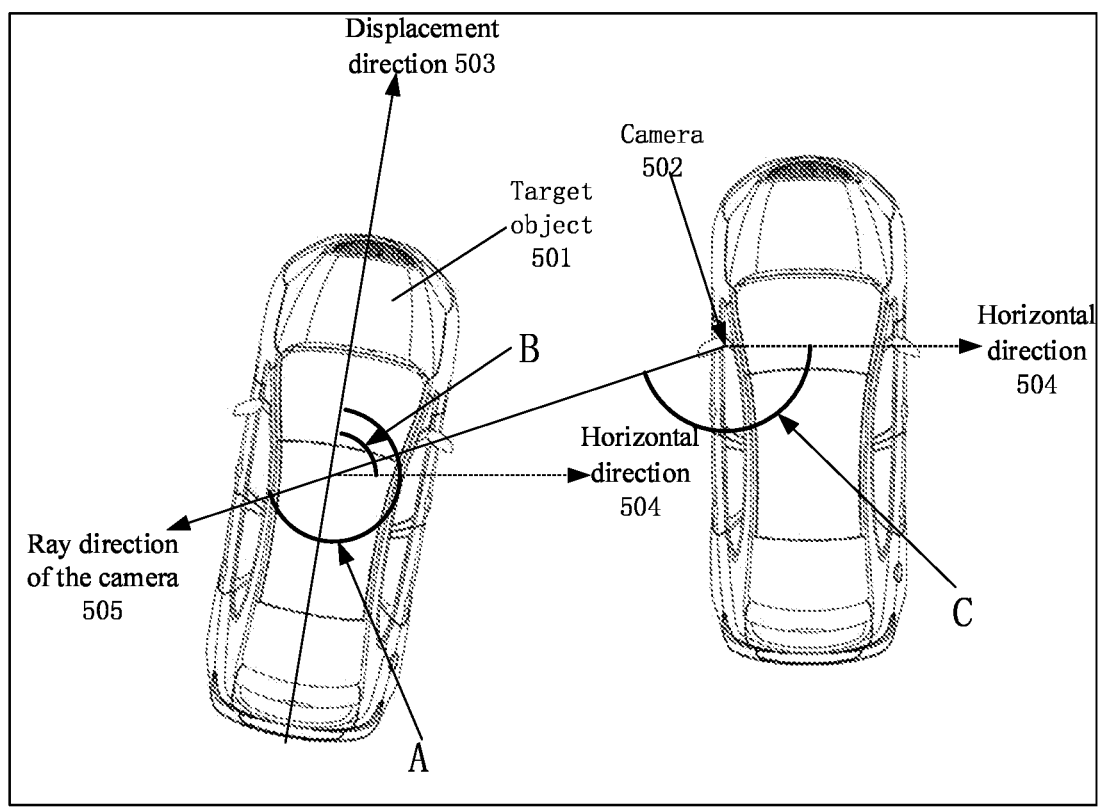
FIG. 5 is a schematic view of an angle of a target object according to an embodiment of the present disclosure.

For example, as shown in FIG. 5, is an angle diagram of a target object, the posture recognition model predicts that the angle of the target object 501 is A, the angle A being determined by an absolute angle B of the target object 501 and an angle C of the camera 502. The absolute angle B is the angle between the displacement direction 503 of the target object and the horizontal direction 504, and the angle C is between a ray direction 505 of the camera and the horizontal direction 504.

Block S32, the electronic device determines a three-dimensional detection frame for each of the at least one target object based on the parameters.

In another embodiment of the present disclosure, the electronic device determines the three-dimensional detection frame in the target image based on the parameters of the target object and vertex coordinates of the two-dimensional detection frame of the target object. For example, the electronic device determines the coordinate of the center point corresponding to the three-dimensional detection frame of the target object based on the vertex coordinates, angles and sizes of the two-dimensional detection frame of the target object, and determines the three-dimensional detection frame of the target object based on the coordinate of the center point.

In another embodiment of the present disclosure, the electronic device obtains the coordinate of the center point of the three-dimensional detection frame of the target object by inputting the size and posture information of the target object to a predetermined set of equations and determines the three-dimensional detection frame of the target object based on the coordinate of the center point. In this embodiment, the set of equations is used to represent a constraint relationship between the two-dimensional detection frame and the three-dimensional detection frame of the target object.

In one embodiment of the present disclosure, the constraint relationship includes that the vertices of the three-dimensional detection frame are all on the frame of the two-dimensional detection frame. The set of preset equations satisfies the following relationship:

$$x_1 = K[RT]X_1$$
$$x_2 = K[RT]X_2$$
$$x_3 = K[RT]X_3$$
$$x_4 = K[RT]X_4$$

$x_1$ represents a first vertex coordinate of the two-dimensional detection frame of the target object, $x_2$ represents a second vertex coordinate of the two-dimensional detection frame of the target object, $x_3$ represents a third vertex coordinate of the two-dimensional detection frame of the target object, $x_4$ represents a fourth vertex coordinate of the two-dimensional detection frame of the target object; K represents an internal parameter matrix of the camera; R represents a rotational matrix calculated from the angle of the target object predicted by the attitude recognition model; T represents a translation vector calculated by the center point coordinate of the three-dimensional detection frame of the object; $X_1$ represents a first vertex coordinate of the target object in a three-dimensional space, $X_2$ represents a second vertex coordinate of the target object in the three-dimensional space, $X_3$ represents a third vertex coordinate of the target object in the three-dimensional space, $X_4$ represents a fourth vertex coordinate of the target object in the three-dimensional space. The first vertex coordinate, the second vertex coordinate, the third vertex coordinate, and the fourth vertex coordinate are determined according to the size of the target object in the three-dimensional space when the center point of the target object is an origin of the coordinates.

In at least one embodiment, when the vertex of the target object in the three-dimensional space is the origin of the coordinates, and the dimensions of the target object predicted by the posture recognition model are $d_x$, $d_y$, and $d_z$, respectively, the four target vertices determined from the eight vertices of the three-dimensional detection frame according to the angle of the target object may be $$X_1 = \left(-\frac{d_x}{2}, -\frac{d_y}{2}, -\frac{d_z}{2}\right), X_2 = \left(-\frac{d_x}{2}, -\frac{d_y}{2}, \frac{d_z}{2}\right),$$
$$X_3 = \left(\frac{d_x}{2}, \frac{d_y}{2}, -\frac{d_z}{2}\right), X_4 = \left(\frac{d_x}{2}, \frac{d_y}{2}, \frac{d_z}{2}\right).$$

The electronic device inputs the four target vertex coordinates and the four vertex coordinates of the two-dimensional detection frame into the preset equation set, and inputs the internal parameter matrix of the camera and the angle predicted by the posture recognition model into the preset equation set. The electronic device obtains the center point coordinate T=($t_x$, $t_y$, $t_z$) of the three-dimensional detection frame of the target object by solving the equation set.

In one embodiment of the present disclosure, the electronic device determines the three-dimensional detection frame of the target object of the target image based on the center point coordinate.

Therefore, by determining the three-dimensional detection frame of the target object and obtaining the size and the coordinates of the target object precisely, the accuracy of determining whether the target object enters the blind area can be improved, thereby reducing the misjudgment situation of the blind area early warning.

Block S33, the electronic device obtains a target detection frame of each of the at least one target object in a top view image of a plane where the vehicle is located by projecting the three-dimensional detection frame into the top view image.

In one embodiment of the present disclosure, the electronic device obtains the target detection frame of the target object in the top view image by projecting the three-dimensional detection frame of the target object to a pre-stored top view image according to an external reference matrix of the camera, and determines whether the target object enters the blind area of the vehicle according to whether the target detection frame and a predetermined blind area of the vehicle in the top view image is overlapped. The electronic device outputs an early warning in response that the target detection frame and the predetermined blind area of the vehicle in the top view image is overlapped.

In one embodiment of the present disclosure, the electronic device obtains a target detection frame of the target object in a top view image by projecting the three-dimensional detection frame of the target object in the target image to a predetermined vehicle coordinate system through a first predetermined projection formula. The first predetermined projection formula satisfies the following relationship:

$$x_a = (R_a \mid T_a)X_a;$$

wherein, $x_a$ represents a coordinate of any one pixel point in the three-dimensional detection frame of the target object in the target image, and $X_a$ represents the coordinate corresponding to the pixel point in a positioning frame. $(R_a \mid T_a)$ represents a predetermined first external outer parameter matrix. The first internal parameter matrix and the first external parameter matrix are used for converting the coordinates of the target object in the camera coordinate system and the coordinates in the vehicle coordinate system to each other, and then deleting the Z coordinates of the vehicle coordinate system to obtain the target detection frame of the target object in the top view image.

Figure 6:
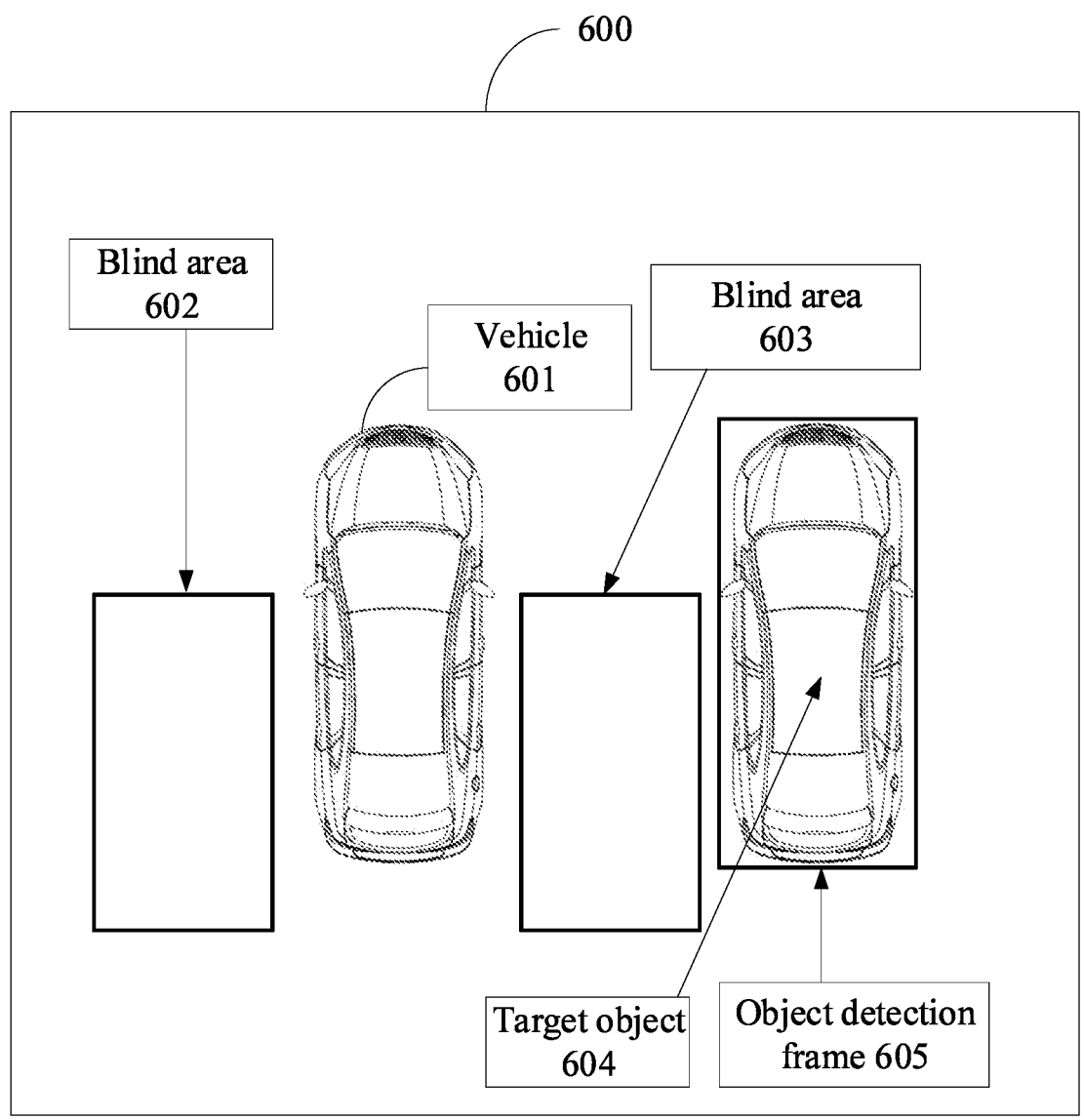
FIG. 6 is a schematic view of a top view image of a plane where the vehicle is located according to an embodiment of the present disclosure.

As shown in FIG. 6, the top view image 600 includes at least one predetermined blind area of the vehicle, such as the blind area 602 and the blind area 603 in FIG. 6. The object detection frame 605 of the target object 604 shown in FIG. 6 is a two-dimensional frame obtained after projecting a three-dimensional detection frame of the target object of the object image into a top view image 600.

In this way, the three-dimensional detection frame of the target object is projected into the top view image, so that a position relationship between the blind area of the vehicle and the target object can be accurately represented, and the accuracy for early warning the blind area of the vehicle can be improved.

In one embodiment of the present disclosure, the electronic device further determines multiple three-dimensional detection frames of target objects in the multiple target images if multiple cameras capture multiple target images at the same time and obtains multiple target detection frames by projecting each of the multiple three-dimensional detection frames to corresponding top view image. The electronic device retains any one of the pluralities of target detection frames in response that an overlapped area exists among the plurality of target detection frames.

In one embodiment of the present disclosure, if there are several cameras equipped on the vehicle, imaging areas of different cameras may overlap, so that different cameras may capture the same target object when the cameras are shooting a target image at the same time. Therefore, when the several cameras are shooting at the same time, the electronic device determines whether an overlapping area exists among the target detection frames corresponding to the three-dimensional detection frames to determine whether the same target object appears in the visual fields of the several cameras. Specifically, when a plurality of target detection frames with the same time stamps has intersections, the multiple target detection frames correspond to the same target. In order to avoid the error of blind zone early warning caused by the multiple target detection frames corresponding to the same target, any one of the multiple target detection frames with the intersections can be retained, thereby eliminating redundant information in the top view image, and improving the accuracy of blind zone early warning.

Exemplary, if the vehicle includes four cameras, for example, camera A, camera B, camera C, and camera D. The camera A, camera B, camera C, and camera D acquire four target images at the same time, then four cameras having the four target images at same target moment, and the four target images may be labeled image A1, image B1, image C1, image D1, respectively. If a three-dimensional detection frame in the image A1 corresponds to a target detection frame in the top view image is frame A11, and a three-dimensional detection frame in the image B1 corresponds to a target detection frame in the top view image is frame B11, and when an overlapped area exists between frame A11 and frame B11, the electronic device retains any one of the frames A11 and B11.

Therefore, when the plurality of cameras acquire a plurality of different target images at the same time and send the plurality of different target images to the electronic device, the electronic device determines whether the target detection frames corresponding to the target objects in the different target images exist an overlapped area, which can remove the redundant information in the top view image, and improve the accuracy for early warning that there is a target object enters the blind area of the vehicle.

Block S34, the electronic device determines whether an overlapped area exists between the target detection frame and a preset blind area of the top view image. If it is determined that there is an overlapped area exists between the target detection frame and the preset blind area of the top view image, the electronic device executes block S35 to output an early warning information. If it is determined that there is no overlapped area exist between the target detection frame and the preset blind area of the top view image, the electronic device executes block S36 is executed to predict a moving trajectory of the target object corresponding to the target detection frame.

In one embodiment of the present disclosure, after the electronic device obtains the target detection frame of the target object in the top view image, the electronic device determines whether output an early warning by determining whether an overlapped area exist between the target detection frame and a preset blind area. The electronic device outputs the early warning information in response that an overlapped area exists between the target detection frame and the preset blind area of the top view image. The early warning information can be voice prompt information, icon prompt information and the like, and the embodiment of the present disclosure is not limited thereto. For example, voice prompt information is played by a horn installed in the vehicle to remind the driver that a vehicle enters a blind area of the vehicle. Another example is to display icon prompt information through a dashboard installed in the vehicle to remind the driver to avoid vehicles driving in the blind area in time.

Block S35, the electronic device outputs alert information.

In one embodiment of the present disclosure, it is determined that the target object corresponding to the target detection frame has entered the blind area of the vehicle in response that there is an overlapped area exist between the target detection frame and the preset blind area of the top view image, which may affect the driving safety of the vehicle, so that the alert information is required for the vehicle.

Block S36, the electronic device predicts a moving trajectory of the target object corresponding to the target detection frame.

In one embodiment of the present disclosure, it is determined that the target object corresponding to the target detection frame does not enter the blind area of the vehicle and the target object has not affected the vehicle driving safety in response that there is no overlapped area exist between the target detection frame and the preset blind area of the top view image, the electronic device does not output the alert information. But the electronic device can predict the moving trajectory of the target object corresponding to the target detection frame for improving driving safety of the vehicle and timely assist the driver or the automatic driving system to avoid possible accidents, to carry out early warning for possible accidents in the future.

In one embodiment of the present disclosure, the electronic device acquires a first target image of the target object acquired by the camera at a first moment and determines a first target detection frame of the target object in the top view image based on the first target image and determines a first coordinate according to the first target detection frame. The electronic device acquires a second target image of the target object by the camera at a second moment and determines a second target detection frame of the target object in the top view image based on the second target image and determines a second coordinate according to the second target detection frame and predicts the moving trajectory of the target object based on the first coordinate and the second coordinate.

Illustratively, first moment corresponding to the first target image is $t_1$, the second moment corresponding to the second target image is $t_2$, and the first coordinate corresponding to the target object in the first target image in the top view image is $(h_1, l_1)$, and the second coordinate corresponding to the target in the second target image in the top view image is $(h_2, l_2)$, the electronic device predict the moving trajectory of the target object according to the first coordinate and the second coordinate.

In one embodiment of the present disclosure, the electronic device determines a time period between the second moment and the first moment and determines a displacement distance of the target object based on the first coordinate and the second coordinate and determines a moving speed of the target object based on the displacement distance and the time period. The electronic device predicts the moving trajectory of the target object based on the moving speed, the first coordinate and the second coordinate by using a Kalman filtering algorithm.

In one embodiment of the present disclosure, the moving speed of the target object is calculated by the following formula:

$$v = \frac{\sqrt{|h_1 - h_2|^2 + |l_1 - l_2|^2}}{t_2 - t_1}$$

In one embodiment of the present disclosure, after the electronic device obtains the moving speed of the target object, the electronic device processes the first coordinate and moving speed of the target object by using a preset trajectory prediction algorithm to predict the first coordinate of the target object at the next moment. For example, the preset trajectory prediction algorithm may be a Kalman filtering algorithm, the electronic device processes the first coordinate and moving speed of the target object with the Kalman filtering algorithm in such a way that the first coordinate of the target object at the next moment is obtained satisfies the following relationship:

$$p_{t+1} = F * p_t + w$$

$p_{t+1}$ represents a state of the target object at the moment of t+1, the state includes the first coordinate $(h_{t+1}, l_{t+1})$ of the target object at the moment of t+1 and the moving speed $v_{t+1}$; F represents a predetermined state transition matrix; $p_t$ represents a state of the target object at the moment of t, the state includes the first coordinate $(h_t, l_t)$ and the moving speed $v_t$ of the target object at the moment of t; w represents a predetermined Gaussian noise, and w is averaged at 0.

In one embodiment of the present disclosure, the electronic device predicts the first coordinate and the moving speed of the target object at the next moment through the first coordinate and the moving speed of the target object at the current moment, and then determines the moving trajectory of the target object according to the predicted plurality of first coordinates. The moving trajectory is used for characterizing the moving route of the target object in the future. Therefore, the electronic device determines whether the target object will enter into a blind area of the vehicle at a certain moment in the future by determines whether the moving trajectory will intersect with the blind area in the future, which provides data support for subsequent early warning for blind area, and improves a timeliness of the early warning for blind zone.

Figure 7:
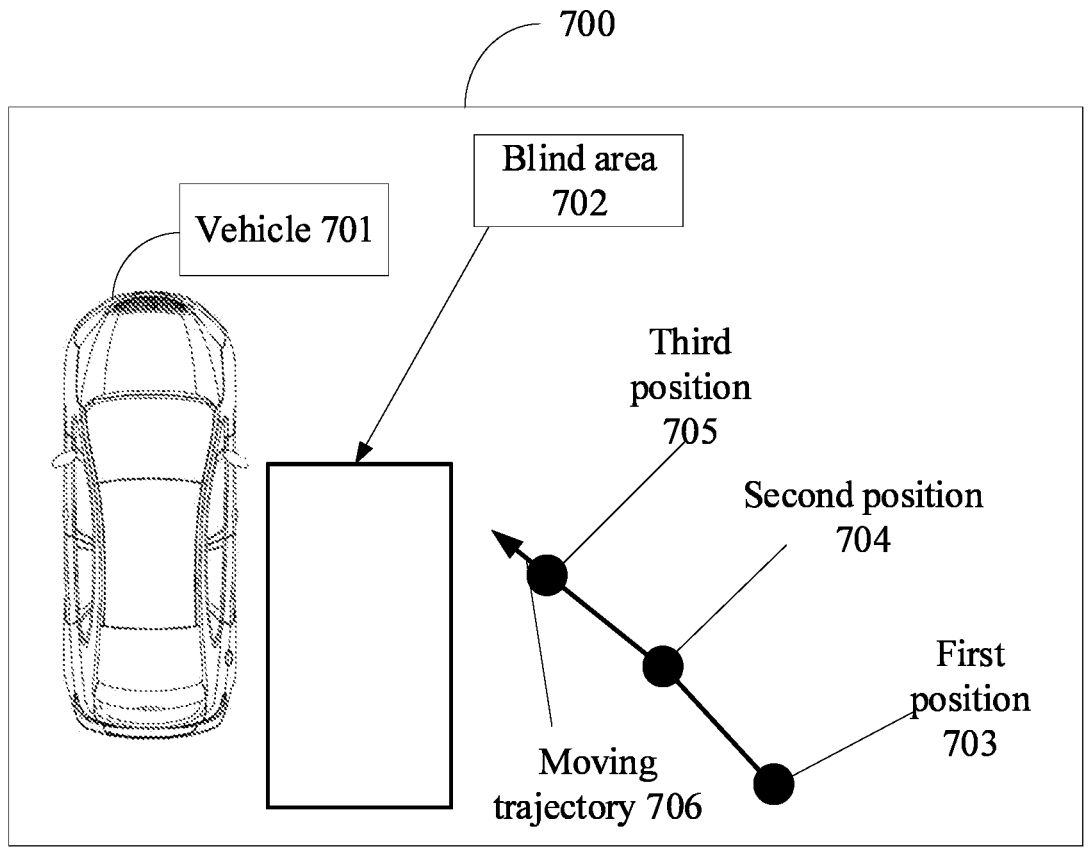
FIG. 7 is a schematic diagram of a moving trajectory of a target object according to an embodiment of the present disclosure.

Exemplary, as shown in FIG. 7, in the top view image 700, the right side of the vehicle 701 includes a blind area 702, the first coordinate of the target object at the moment of t is a first position 703 in FIG. 7, the first coordinate at the moment of t+1 is a second position 704, and the first coordinate at the moment of t+2 is a third position 705. A connection line of the first position 703, the second position 704, and the third position 705 is the moving trajectory 706 of the target object. When the moving trajectory 706 intersects the blind area 702, it indicates that the target object will enter the blind area 702 in the future, and therefore an early warning for the blind area is required to avoid possible accidents in a timely manner.

In one embodiment of the present disclosure, the method further includes the electronic device calculates a time period from the target object outside the blind area to the target object enters the blind area based on the position information and moving speed of the target object and performs a countdown alert based on the time interval.

In one embodiment of the present disclosure, the electronic device calculates the time period required for the target object to enter the blind area based on the angle and moving speed of the target object, and outputs a countdown signal based on the time period, thereby improving the accuracy of the early warning for the blind area.

As can be seen from the technical scheme, the present disclosure obtains a three-dimensional detection frame of a target object by acquiring at least one target image acquired by a camera, recognizing the target object in the target image, obtaining the target detection frame of the target object in the plane where the vehicle is located according to the three-dimensional detection frame, and determining whether the target detection frame intersects with a preset blind area of the vehicle in a top view image or not so as to carry out blind area early warning. Therefore, the electronic device determines whether the target object enters the blind area of the vehicle based on the projection of the three-dimensional detection frame in the top view image and can accurately determine the distance between the target object and the vehicle, avoid misjudgment and improve the early warning accuracy of the blind area. and outputting early warning information according to whether the target detection frame intersects with the blind area preset by the plane where the vehicle is located or not. Therefore, the target object can be characterized by a three-dimensional detection frame, a negative influence of the distortion of the two-dimensional detection frame on the object identification when the target object is characterized by the two-dimensional detection frame can be avoided, and the accuracy of early warning for the blind area is improved. After obtaining the three-dimensional detection frame of the target object, projecting the three-dimensional detection frame to a pre-stored top view image to obtain the target detection frame of the target.

Figure 8:
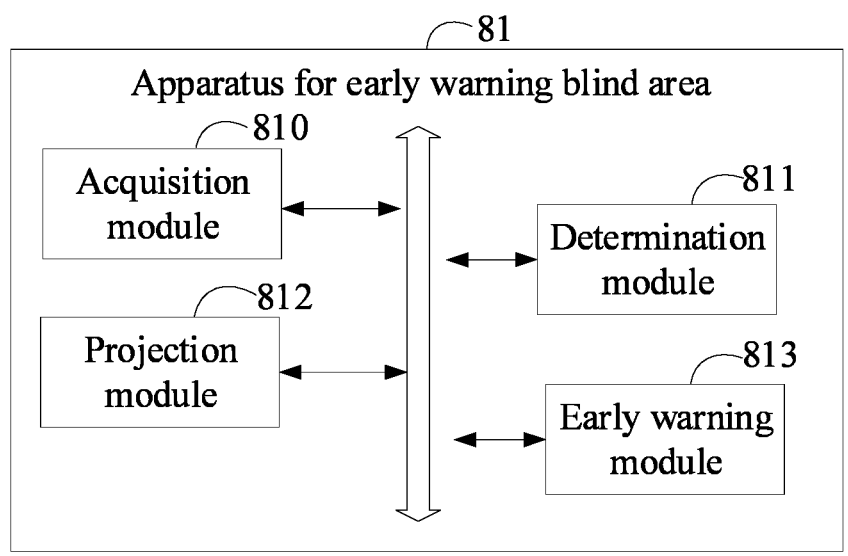
FIG. 8 is a function module diagram of a device for early waring a blind area according to an embodiment of the present disclosure.

Referring to FIG. 8, a functional block diagram of a preferred embodiment of an apparatus for early warning a blind area of the present disclosure is shown. The apparatus 81 for early warning a blind area includes an acquisition module 810, a determination module 811, a projection module 812, and an early warning module 813. As used herein, a module/unit refers to a series of computer-readable instruction segments that are capable of being executed by processor 13 and capable of performing fixed functions, which are stored in storage device 12. In this embodiment, the functions of each module/unit will be described in more detail in subsequent embodiments.

The acquisition module 810 obtains at least one target image acquired by at least one camera of the vehicle.

The determination module 811 determines parameters of at least one target object in each of the at least one target image and determines a three-dimensional detection frame for each of the at least one target object based on the parameters.

The projection module 812 obtains a target detection frame of each of the at least one target object in a top view image of a plane where the vehicle is located by projecting the three-dimensional detection frame into the top view image.

The early warning module 813 outputs alert information in response that an overlapped area exists between the target detection frame and a preset blind area of the top view image.

In one embodiment of the present disclosure, the parameters include a size of each of the at least one target object and posture information of each of the at least one target object, the determination module 811 obtains a two-dimensional detection frame corresponding to each of the at least one target object by inputting the at least one target image to a target detection model and obtains a category of each of the at least one target object and posture information of the each of the at least one target object by inputting image information corresponding to the two-dimensional detection frame to a posture recognition model. And the determination module 811 determines the size of each of the at least one target object according to the category of each of the at least one target object.

In another embodiment, the determination module 811 obtains a coordinate of a center point of the three-dimensional detection frame of t each of the at least one target object by inputting the size and posture information of each of the at least one target object to a predetermined set of equations, and the set of equations is used to represent a constraint relationship between the two-dimensional detection frame and the three-dimensional detection frame of each of the at least one target object. The determination module 811 determines the three-dimensional detection frame of the target object based on the coordinate of the center point.

In one embodiment of the present disclosure, the determination module 811 also determines a three-dimensional detection frame corresponding to each of the at least one target object of each of a plurality of target images captured by a plurality of cameras of the vehicle at the same time and obtains a plurality of target detection frames by projecting three-dimensional detection frame to corresponding top view image and retains any one of the plurality of target detection frames in response that an overlapped area exists among the plurality of target detection frames.

In one embodiment of the present disclosure, the early warning module 813 predicts a moving trajectory of the target object corresponding to the target detection frame in response that no overlapped area exists between the target detection frame and the preset blind area of the top view image and outputs the alert information in response that no intersection between the moving trajectory and the preset blind area.

In one embodiment of the present disclosure, the early warning module 813 further acquires a first target image of the target object acquired by a camera of the at least one camera at a first moment and determines a first target detection frame of the target object in the top view image based on the first target image, and a first coordinate according to the first target detection frame. The early warning module 813 further acquires a second target image of the target object by the camera at a second moment and determines a second target detection frame of the target object in the top view image based on the second target image and determines a second coordinate according to the second target detection frame. The early warning module 813 further predicts the moving trajectory of the target object based on the first coordinate and the second coordinate.

In one embodiment of the present disclosure, the early warning module 813 further determines a time period between the second moment and the first moment and a displacement distance of the target object based on the first coordinate and the second coordinate, and a moving speed of the target object based on the displacement distance and the time period. The early warning module 813 further predicts the moving trajectory of the target object based on the moving speed, the first coordinate and the second coordinate by using a Kalman filtering algorithm.

As can be seen from the technical scheme, the present disclosure obtains a three-dimensional detection frame of a target object by acquiring at least one target image acquired by a camera, recognizing the target object in the target image, obtaining the target detection frame of the target object in the plane where the vehicle is located according to the three-dimensional detection frame, and determining whether the target detection frame intersects with a preset blind area of the vehicle in a top view image or not so as to carry out blind area early warning. Therefore, the electronic device determines whether the target object enters the blind area of the vehicle based on the projection of the three-dimensional detection frame in the top view image and can accurately determine the distance between the target object and the vehicle, avoid misjudgment and improve the early warning accuracy of the blind area. and outputting early warning information according to whether the target detection frame intersects with the blind area preset by the plane where the vehicle is located or not. Therefore, the target object can be characterized by a three-dimensional detection frame, a negative influence of the distortion of the two-dimensional detection frame on the object identification when the target object is characterized by the two-dimensional detection frame can be avoided, and the accuracy of early warning for the blind area is improved. After obtaining the three-dimensional detection frame of the target object, projecting the three-dimensional detection frame to a pre-stored top view image to obtain the target detection frame of the target.

Figure 9:
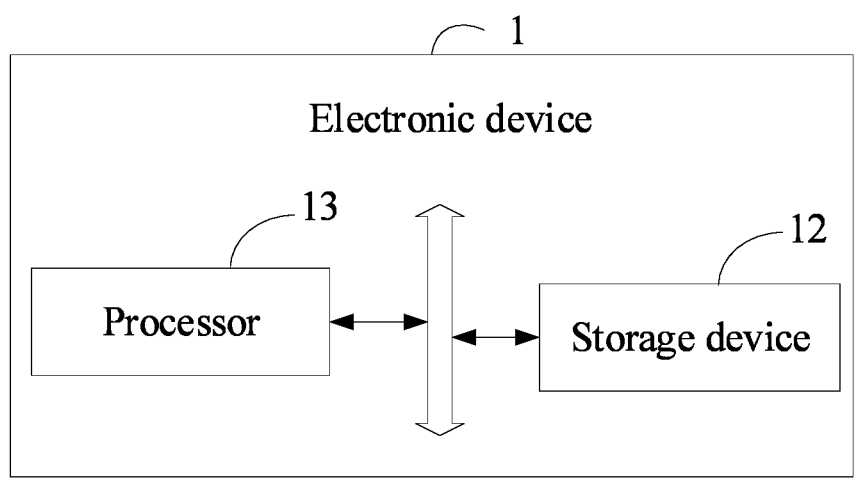
FIG. 9 is a block diagram of an electronic device according to an embodiment of the present disclosure.

Referring to FIG. 9, there is shown a schematic diagram of an electronic device provided in an embodiment of the present disclosure. The electronic device 1 includes a storage device 12 and a processor 13. The storage device 12 is used to store computer-readable instructions, and the processor 13 executes the computer-readable instructions stored in the storage device to implement the method for early warning a blind area described in any of the embodiments described above.

In one embodiment of the present disclosure, the electronic device 1 also includes a bus, a computer program stored in the storage device 12 and operable on the processor 13, such as a blind spot alert program.

FIG. 9 only shows the electronic device 1 with the storage device 12 and the processor 13. Those skilled in the art can understand that the structure shown in FIG. 9 does not limit the electronic device 1 and may include less than what is shown in the figure. Or more parts, or a combination of certain parts, or a different arrangement of parts.

Figure 3:
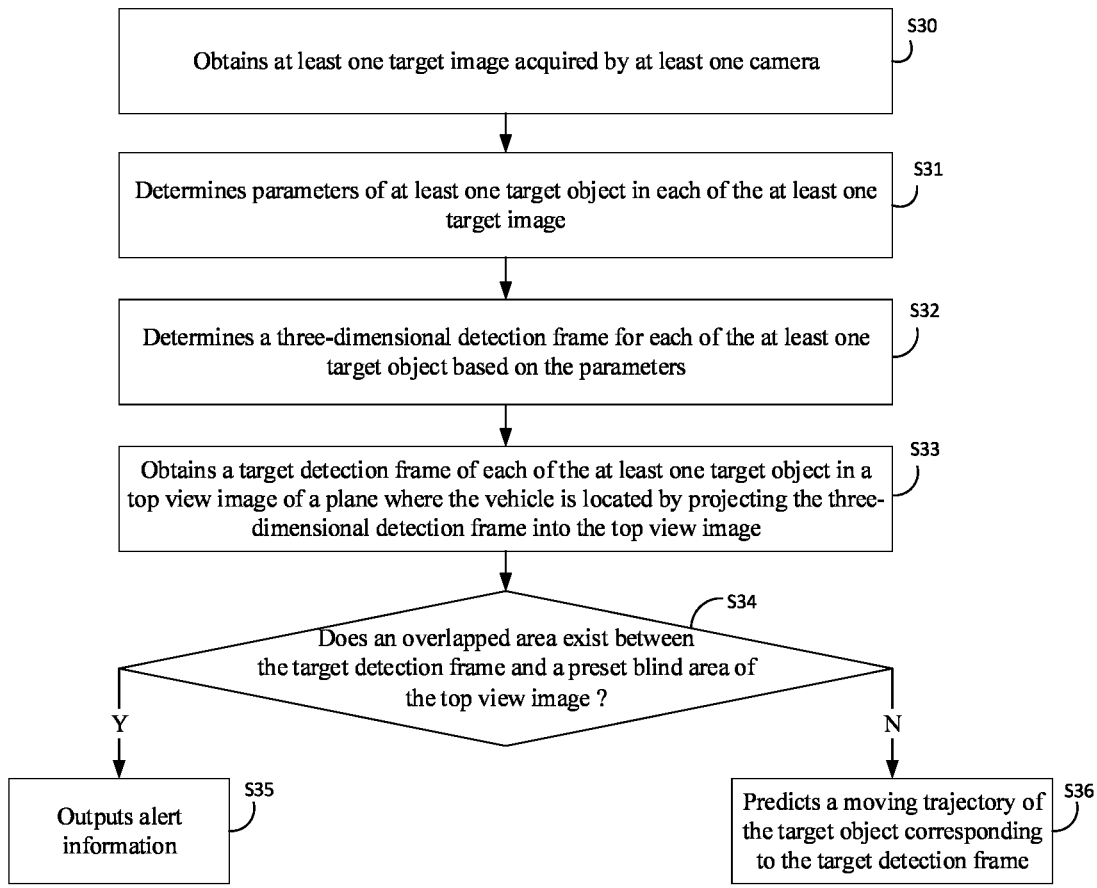
FIG. 3 is a flowchart of a method for early warning a blind area according to an embodiment of the present disclosure.

In connection with FIG. 3, the storage device 12 in the electronic device 1 stores multiple computer-readable instructions to implement a method for early warning a blind area, the processor 13 may execute the multiple instructions to implement: obtaining at least one target image acquired by at least one camera of the vehicle; determining parameters of at least one target object in each of the at least one target image; determining a three-dimensional detection frame for each of the at least one target object based on the parameters; obtaining a target detection frame of each of the at least one target object in a top view image of a plane where the vehicle is located by projecting the three-dimensional detection frame into the top view image; and outputting alert information in response that an overlapped area exists between the target detection frame and a preset blind area of the top view image.

Specifically, for the specific implementation method of the above instructions by the processor 13, reference can be made to the description of relevant blocks in the corresponding embodiment in FIG. 3, which will not be described again here.

Those skilled in the art can understand that the schematic diagram is only an example of the electronic device 1 and does not constitute a limitation on the electronic device 1. The electronic device 1 can be a bus structure or a star structure. The electronic device 1 can also include more or less other hardware or software than shown in the figure, or different component arrangements. For example, the electronic device 1 may also include input and output devices, network access devices, etc.

It should be noted that the electronic device 1 is only an example. If other existing or possible electronic products that may appear in the future can be adapted to the present disclosure, they should also be included in the protection scope of the present disclosure and be included here by reference.

The storage device 12 includes at least one type of readable storage medium, which may be non-volatile or volatile. The readable storage medium includes flash memory, mobile hard disk, multimedia card, card-type memory (such as SD or DX memory, etc.), magnetic memory, magnetic disk, optical disk, etc. In some embodiments, the storage device 12 may be an internal storage unit of the electronic device 1, such as a mobile hard disk of the electronic device 1. In other embodiments, the storage device 12 may also be an external storage device of the electronic device 1, such as a plug-in mobile hard disk, a smart memory card (SMC), or a secure digital (SD) card equipped on the electronic device 1, a Flash Card, etc. The storage device 12 can not only be used to store application software installed on the electronic device 1 and various types of data, such as codes for early warning a blind area programs, but can also be used to temporarily store data that has been output or is to be output.

The processor 13 may be comprised of integrated circuits in some embodiments, such as integrated circuits in a single package, or multiple integrated circuits in packages of the same or different functions, including one or more central processing units (CPUs), microprocessors, digital processing chips, graphics processors, combinations of various control chips, etc. The processor 13 is the control core (Control Unit) of the electronic device 1, which uses various interfaces and circuits to connect various components of the entire electronic device 1 by running or executing programs or modules stored in the storage device 12 (e.g., executing early warning a blind area programs) and invoking data stored in the storage device 12 to perform various functions of the electronic device 1 and process data.

The processor 13 executes the operating system of the electronic device 1 and the various types of applications installed. The processor 13 executes the application program to implement the blocks in the various embodiments of the method described above, such as those shown in FIG. 3.

By way of example, the computer program may be partitioned into one or more modules/units stored in the storage device 12 and executed by the processor 13 to complete the present disclosure. The one or more modules/units may be a series of computer-readable instruction segments capable of performing a particular function that describes the execution of the computer program in the electronic device 1. For example, the computer program may be divided into an acquisition module 810, a determination module 811, a projection module 812, and an early warning module 813.

The above-mentioned integrated unit in the form of a software functional module may be stored in a computer-readable storage medium. The software functional modules described above are stored in a storage medium and include instructions for causing a computer device (which may be a personal computer, computer device, or network device, etc.) or a processor to perform portions of the method described in various embodiments of the present disclosure.

The modules/units integrated with the electronic device 1 may be stored in a computer-readable storage medium if implemented in the form of software functional units and sold or used as separate products. Based on this understanding, the present disclosure implements all or part of the flow of the methods of the above embodiments and may also be accomplished by instructing the associated hardware device through a computer program stored in a computer-readable storage medium which, when executed by a processor, may implement the blocks of the various method embodiments described above.

wherein the computer program includes computer program code, which may be in the form of source code, object code, an executable file, or some intermediate form, etc. The computer-readable medium may include any entity or device capable of carrying the computer program code, a recording medium, a USB flash drive, a removable hard disk, a magnetic disk, an optical disk, a computer memory, a read-only memory (ROM), a random-access memory, and other memories.

Further, the computer-readable storage medium may comprise essentially a storage program area storing an operating system, an application program required for at least one function, etc., and a storage data area. The storage data area may store data created from the use of a blockchain node, etc.

The bus may be a PCI bus or an Extended Industry Standard Architecture (EISA) bus. The bus can be divided into address bus, data bus, control bus and so on. For ease of illustration, only one arrow is shown in FIG. 9, but it does not indicate that there is only one bus or one type of bus. The bus is configured to implement connection communications between the storage device 12 and at least one processor 13 or the like.

Embodiments of the present disclosure also provide a computer-readable storage medium (not shown) in which computer-readable instructions are stored and executed by a processor in an electronic device to implement the method for early warning a blind area as described in any of the above embodiments.

In several embodiments provided herein, it should be understood that the disclosed system, apparatus, and method may be implemented in other ways. For example, the embodiments of the apparatus described above are merely illustrative, for example, the partitioning of the modules, which is merely a logical functional partition, may actually be implemented in a different way.

The modules described as separate components may or may not be physically separated, and the components shown as modules may or may not be physical units, that is, they may be located in one place, or they may be distributed to multiple network units. Some or all of the modules can be selected according to actual needs to achieve the purpose of the solution of this embodiment.

In addition, each functional module in various embodiments of the present application can be integrated into one processing unit, or each unit can exist physically alone, or two or more units can be integrated into one unit. The above-mentioned integrated unit can be implemented in the form of hardware or in the form of hardware plus software function modules.

Furthermore, it is clear that the word "comprising" does not exclude other elements or steps, and the singular does not exclude the plural. Multiple units or devices stated in the specification may also be implemented by one unit or device through software or hardware. The words first, second, etc. are used to indicate names and do not indicate any specific order. Finally, it should be noted that the above embodiments are only used to illustrate the technical solutions of the present disclosure and are not limiting. Although the present disclosure has been described in detail with reference to the preferred embodiments, those of ordinary skill in the art should understand that the technical solutions of the present disclosure can be modified. Modifications or equivalent substitutions may be made without departing from the spirit and scope of the technical solution of the present disclosure.

What is claimed is:

1. A method for early warning a blind area of a vehicle, the method comprising:
   obtaining at least one target image acquired by at least one camera of the vehicle;
   determining parameters of at least one target object in each of the at least one target image;
   determining a three-dimensional detection frame for each of the at least one target object based on the parameters;
   obtaining a target detection frame of each of the at least one target object in a top view image of a plane where the vehicle is located by projecting the three-dimensional detection frame into the top view image; and
   outputting alert information in response that an overlapped area exists between the target detection frame and a preset blind area of the top view image.

2. The method according to claim 1, wherein the parameters comprise a size and posture information of each of the at least one target object, determining the parameters of the at least one target object in each of the at least one target image further comprises:
   obtaining a two-dimensional detection frame corresponding to each of the at least one target object by inputting the at least one target image to a target detection model;
   obtaining a category of each of the at least one target object and the posture information of the each of the at least one target object by inputting image information corresponding to the two-dimensional detection frame to a posture recognition model; and
   determining the size of each of the at least one target object according to the category of each of the at least one target object.

3. The method according to claim 2, wherein determining the three-dimensional detection frame for each of the at least one target object based on the parameters further comprises:
   obtaining a coordinate of a center point of the three-dimensional detection frame of each of the at least one target object by inputting the size and the posture information of each of the at least one target object to a predetermined set of equations, and the predetermined set of equations is used to represent a constraint relationship between the two-dimensional detection frame and the three-dimensional detection frame of each of the at least one target object; and
   determining the three-dimensional detection frame of each of the at least one target object based on the coordinate of the center point.

4. The method according to claim 1, further comprising:
   determining the three-dimensional detection frame corresponding to each of the at least one target object of each of a plurality of target images captured by a plurality of cameras of the vehicle at the same time;
   obtaining a plurality of target detection frames by projecting the three-dimensional detection frame to corresponding top view images; and
   retaining any one of the plurality of target detection frames in response that an overlapped area exists among the plurality of target detection frames.

5. The method according to claim 1, further comprising:
   predicting a moving trajectory of the at least one target object corresponding to the target detection frame in response that no overlapped area exists between the target detection frame and the preset blind area of the top view image; and outputting the alert information in response that no intersection between the moving trajectory and the preset blind area.

6. The method according to claim 5, wherein predicting the moving trajectory of the at least one target object corresponding to the target detection further comprises:
   acquiring a first target image of the at least one target object acquired by a camera of the at least one camera at a first moment;
   determining a first target detection frame of each of the at least one target object in the top view image based on the first target image;
   determining a first coordinate according to the first target detection frame;
   acquiring a second target image of the each of the at least one target object by the camera of the at least one camera at a second moment;
   determining a second target detection frame of the each of the at least one target object in the top view image based on the second target image;
   determining a second coordinate according to the second target detection frame; and
   predicting the moving trajectory of the each of the at least one target object based on the first coordinate and the second coordinate.

7. The method according to claim 6, wherein predicting the moving trajectory of the each of the at least one target object based on the first coordinate and the second coordinate further comprises:
   determining a time period between the second moment and the first moment;
   determining a displacement distance of the each of the at least one target object based on the first coordinate and the second coordinate;
   determining a moving speed of the each of the at least one target object based on the displacement distance and the time period; and
   predicting the moving trajectory of the each of the at least one target object based on the moving speed, the first coordinate, and the second coordinate by using a Kalman filtering algorithm.

8. An electronic device comprising:
   a storage device;
   at least one processor, wherein
   the storage device stores one or more programs, which when executed by the at least one processor, cause the at least one processor to:
      obtain at least one target image acquired by at least one camera of a vehicle;
      determine parameters of at least one target object in each of the at least one target image;
      determine a three-dimensional detection frame for each of the at least one target object based on the parameters;
      obtain a target detection frame of each of the at least one target object in a top view image of a plane where the vehicle is located by projecting the three-dimensional detection frame into the top view image; and
      output alert information in response that an overlapped area exists between the target detection frame and a preset blind area of the top view image.

9. The electronic device according to claim 8, wherein the parameters comprise a size and posture information of each of the at least one target object, the at least one processor determines the parameters of the at least one target object in each of the at least one target image by:
   obtaining a two-dimensional detection frame corresponding to each of the at least one target object by inputting the at least one target image to a target detection model;
   obtaining a category of each of the at least one target object and the posture information of the each of the at least one target object by inputting image information corresponding to the two-dimensional detection frame to a posture recognition model; and
   determining the size of each of the at least one target object according to the category of each of the at least one target object.

10. The electronic device according to claim 9, wherein the at least one processor determines the three-dimensional detection frame for each of the at least one target object based on the parameters by:
   obtaining a coordinate of a center point of the three-dimensional detection frame of each of the at least one target object by inputting the size and the posture information of each of the at least one target object to a predetermined set of equations, and the predetermined set of equations is used to represent a constraint relationship between the two-dimensional detection frame and the three-dimensional detection frame of each of the at least one target object; and
   determining the three-dimensional detection frame of each of the at least one target object based on the coordinate of the center point.

11. The electronic device according to claim 8, wherein the at least one processor further caused to:
   determine the three-dimensional detection frame corresponding to each of the at least one target object of each of a plurality of target images captured by a plurality of cameras of the vehicle at the same time;
   obtain a plurality of target detection frames by projecting the three-dimensional detection frame to corresponding top view images; and
   retain any one of the plurality of target detection frames in response that an overlapped area exists among the plurality of target detection frames.

12. The electronic device according to claim 8, wherein the at least one processor further caused to:
   predicting a moving trajectory of the at least one target object corresponding to the target detection frame in response that no overlapped area exists between the target detection frame and the preset blind area of the top view image; and
   outputting the alert information in response that no intersection between the moving trajectory and the preset blind area.

13. The electronic device according to claim 12, wherein the at least one processor predicts the moving trajectory of the at least one target object corresponding to the target detection by:
   acquiring a first target image of the at least one target object acquired by a camera of the at least one camera at a first moment;
   determining a first target detection frame of each of the at least one target object in the top view image based on the first target image;
   determining a first coordinate according to the first target detection frame;
   acquiring a second target image of the each of the at least one target object by the camera of the at least one camera at a second moment;
   determining a second target detection frame of the each of the at least one target object in the top view image based on the second target image;

determining a second coordinate according to the second target detection frame; and predicting the moving trajectory of the each of the at least one target object based on the first coordinate and the second coordinate.

14. The electronic device according to claim 13, wherein the at least one processor predicts the moving trajectory of the each of the at least one target object based on the first coordinate and the second coordinate by:

determining a time period between the second moment and the first moment;

determining a displacement distance of the each of the at least one target object based on the first coordinate and the second coordinate;

determining a moving speed of the each of the at least one target object based on the displacement distance and the time period; and predicting the moving trajectory of the each of the at least one target object based on the moving speed, the first coordinate, and the second coordinate by using a Kalman filtering algorithm.

15. A non-transitory storage medium having instructions stored thereon, when the instructions are executed by a processor of an electronic device, the processor is caused to perform a method for early warning a blind area of a vehicle, wherein the method comprises:

obtaining at least one target image acquired by at least one camera of the vehicle;

determining parameters of at least one target object in each of the at least one target image;

determining a three-dimensional detection frame for each of the at least one target object based on the parameters;

obtaining a target detection frame of each of the at least one target object in a top view image of a plane where the vehicle is located by projecting the three-dimensional detection frame into the top view image; and outputting alert information in response that an overlapped area exists between the target detection frame and a preset blind area of the top view image.

16. The non-transitory storage medium according to claim 15, wherein the parameters comprise a size and posture information of each of the at least one target object, determining the parameters of the at least one target object in each of the at least one target image further comprises:

obtaining a two-dimensional detection frame corresponding to each of the at least one target object by inputting the at least one target image to a target detection model;

obtaining a category of each of the at least one target object and the posture information of the each of the at least one target object by inputting image information corresponding to the two-dimensional detection frame to a posture recognition model; and determining the size of each of the at least one target object according to the category of each of the at least one target object.

17. The non-transitory storage medium according to claim 16, wherein determining the three-dimensional detection frame for each of the at least one target object based on the parameters further comprises:

obtaining a coordinate of a center point of the three-dimensional detection frame of each of the at least one target object by inputting the size and the posture information of each of the at least one target object to a predetermined set of equations, and the predetermined set of equations is used to represent a constraint relationship between the two-dimensional detection frame and the three-dimensional detection frame of each of the at least one target object; and determining the three-dimensional detection frame of each of the at least one target object based on the coordinate of the center point.

18. The non-transitory storage medium according to claim 15, wherein the method further comprises:

determining the three-dimensional detection frame corresponding to each of the at least one target object of each of a plurality of target images captured by a plurality of cameras of the vehicle at the same time;

obtaining a plurality of target detection frames by projecting the three-dimensional detection frame to corresponding top view images; and retaining any one of the plurality of target detection frames in response that an overlapped area exists among the plurality of target detection frames.

19. The non-transitory storage medium according to claim 15, wherein the method further comprises:

predicting a moving trajectory of the at least one target object corresponding to the target detection frame in response that no overlapped area exists between the target detection frame and the preset blind area of the top view image; and outputting the alert information in response that no intersection between the moving trajectory and the preset blind area.

20. The non-transitory storage medium according to claim 19, wherein predicting the moving trajectory of the at least one target object corresponding to the target detection further comprises:

acquiring a first target image of the at least one target object acquired by a camera of the at least one camera at a first moment;

determining a first target detection frame of each of the at least one target object in the top view image based on the first target image;

determining a first coordinate according to the first target detection frame;

acquiring a second target image of the each of the at least one target object by the camera of the at least one camera at a second moment;

determining a second target detection frame of the each of the at least one target object in the top view image based on the second target image;

determining a second coordinate according to the second target detection frame; and predicting the moving trajectory of the each of the at least one target object based on the first coordinate and the second coordinate.

* * * * *